United States Patent

Engel et al.

[11] Patent Number: 6,028,866
[45] Date of Patent: Feb. 22, 2000

[54] SYSTEM FOR COMMUNICATING BETWEEN A GROUP OF APPARATUSES

[75] Inventors: Anna J. P. M. Engel; Leonardus G. M. Beuk, both of Eindhoven, Netherlands

[73] Assignee: U.S. Philips Corporation, New York, N.Y.

[21] Appl. No.: 08/763,865

[22] Filed: Dec. 11, 1996

[30] Foreign Application Priority Data

Dec. 22, 1995 [EP] European Pat. Off. .............. 95203613

[51] Int. Cl.[7] .................................................. H04L 12/43
[52] U.S. Cl. ........................................... 370/461; 370/312
[58] Field of Search ..................................... 370/310, 312, 370/313, 315, 349, 338, 389, 425, 462, 347, 461; 371/31, 32

[56] References Cited

U.S. PATENT DOCUMENTS

| | | | |
|---|---|---|---|
| 4,998,199 | 3/1991 | Tashiro et al. | 364/410 |
| 5,040,175 | 8/1991 | Tuch et al. | 370/245 |
| 5,636,209 | 6/1997 | Perlman | 370/281 |
| 5,677,909 | 10/1997 | Heide | 370/347 |
| 5,748,100 | 5/1998 | Gutman et al. | 340/825.44 |
| 5,774,673 | 6/1998 | Beuk et al. | 395/200.66 |

FOREIGN PATENT DOCUMENTS

0488823A1 6/1992 European Pat. Off. ........ H04L 12/18
3508562 9/1986 Germany .

*Primary Examiner*—Chi H. Pham
*Assistant Examiner*—Kim T. Nguyen
*Attorney, Agent, or Firm*—Gregory L. Thorne

[57] ABSTRACT

The system allows a group of end apparatuses (101, 102, 103, . . .), such as a game computer or a PDA, to communicate wirelessly, for instance via infra-red. In order to increase the reliability of the communication, the end apparatuses communicate via a central apparatus 100. This makes it easier to maintain contact. Furthermore, conventional acknowledgement schemes can be used to increase the reliability of the communication between an end apparatus and the central apparatus 100. Each end apparatus comprises execution means 240 for executing a group application. During the execution, the group application communicates to a corresponding group application in at least one end apparatus. The communication takes place by exchanging application messages. To this end, an end apparatus uses message sending means 200 to send the application message to the central apparatus 100. Message receiving means 210 of the central apparatus 100 receive the message. Group resolution means 250 of the central apparatus determine for which group of end apparatuses the received application message is destined. The group resolution means 250 use message sending means 200 to transmit the received application message to end apparatuses of the group. Message receiving means 210 in the end apparatuses receive the message.

15 Claims, 8 Drawing Sheets

SYSTEM FOR COMMUNICATING BETWEEN A GROUP OF APPARATUSES

BACKGROUND OF THE INVENTION

1. Field of the Invention

The invention relates to a communication system comprising a sending apparatus and a receiving apparatus communicating via a wireless communication medium;

said receiving apparatus comprising message receiving means for receiving via said wireless communication medium a message destined for said receiving apparatus;

said sending apparatus comprising message sending means for transmitting a message via said wireless communication medium.

The invention further relates to an end apparatus, a central apparatus, and a relay apparatus suitable for use in such a system.

2. Related Art

Communication between two apparatuses can occur in many ways. Wireless communication is widely used for communication involving portable apparatuses. For consumer electronics products, infrared light is commonly used as a carrier for wireless Communication. In known infrared communication systems, a sending apparatus, such as a hand-held remote control, comprises an infrared transmitter and a receiving apparatus, such as a television set, comprises an infrared receiver. The information is transmitted in the form of message frames. The message frames are limited to a maximum size, allowing the transmitting and receiving apparatus to use buffers with a corresponding maximum size for temporarily storing the message frames. By using simple communication protocols and operating at low bit-rates, cost-effective communication is achieved. Typically, the protocols are executed by the main CPU, requiring no dedicated logic or communication ICs in addition to an infrared transmitter or an infrared receiver. A transmission via infrared, however, can easily be disrupted, for instance, by other infrared transmitters operating at the same frequency. In order to increase reliability of such communication systems, acknowledgement mechanisms are used to report correct reception of a transmitted frame. If no acknowledgement frame is received in response to transmitting a message frame, the message frame may be retransmitted up to a predetermined maximum number of times. The acknowledgement mechanism can also be used to detect that no communication was possible, for instance, in situations where the maximum operating distance is exceeded or optical contact is broken. To support the acknowledgement mechanism, both apparatuses comprise an infrared transmitter and an infrared receiver. Such a system is known from DE-A-3508562.

This system describes the communication between two apparatuses, with the sending apparatus generating message frames and receiving acknowledgement frames, whereas the receiving apparatus receives message frames and generates acknowledgement frames in response.

BRIEF SUMMARY OF THE INVENTION

It is an object of the invention to provide a system of the kind set forth in which any apparatus can reliably communicate to a plurality of other apparatuses.

To achieve this object, the system according to the invention is characterised: in that said system comprises at least three end apparatuses and a central apparatus; each end apparatus and the central apparatus being a sending apparatus as well as a receiving apparatus; in that each end apparatus comprises execution means for executing a group application; said group application, while being executed by said execution means, communicating application messages to a corresponding group application in at least one end apparatus; in that said message sending means of each end apparatus is conceived to send said application message to said central apparatus; in that said central apparatus comprises group resolution means for, upon said message receiving means receiving a first application message from a first one of said end apparatuses, determining a group of end apparatuses for which said first application message is destined and for causing said message sending means to transmit said first application message to end apparatuses of said group.

Advantageously, group related information is managed by the central apparatus, ensuring that the complexity and cost of the end apparatuses do not increase. Furthermore, by suitably positioning of the central apparatus, the range wherein the appratuses can reliable communicate is extended. Particularly, for infra-red communication between more than two apparatuses, it is difficult to establish and maintain optical contact between the apparatuses. By using a central apparatus via which the communication takes place, it is sufficient to maintain optical contact between an end apparatus and the central apparatus, which can, for instance, be achieved by pointing the end apparatus at the central apparatus. This reduces the chance of unsuccessful transmission.

A further embodiment of a system according to the invention, wherein said receiving apparatus comprises a communication identification, which identifies said receiving apparatus with respect to said wireless communication medium; said message receiving means is conceived to receive a message in a message frame identifying said receiving apparatus; said message sending means is conceived to transmit a message in a message frame identifying a receiving apparatus, is characterised in that said group resolution means is conceived to transmit said first application message to end apparatuses of said group by causing said message sending means to transmit separate message frames, each comprising said first application message, to said end apparatuses of said group. By using the conventional communication in the form of message frames exchanged between two apparatuses, the complexity of the end apparatuses is kept low. Furthermore, a conventional acknowledgment scheme can be used to further increase the reliability of the group communication. Since in this embodiment the communication between a group of apparatuses is achieved by a series of communication involving only two apparatuses, a conventional acknowledgement scheme, which increases the reliability of the communication between two apparatuses, can be used to increase the reliability of the group communication even further.

A further embodiment of a system according to the invention is characterised in that said message sending means is conceived to transmit a message in a broadcast frame; in that said message receiving means is conceived to receive a message in a broadcast frame; in that said group resolution means is conceived to transmit said first application message to end apparatuses of said group by causing said message sending means to transmit a broadcast frame comprising said first application message to said end apparatuses of said group. By broadcasting the message, the central apparatus very efficiently distributes the message. Since all end apparatuses should maintain contact with the central apparatus broadcasting will be sufficiently reliable for most systems, even if no additional acknowledgement scheme is used. Advantageously, a broadcasting scheme is used which allows simultaneous transmission of a message to a selected group of apparatuses, usually referred to as multi-casting.

A further embodiment of a system according to the invention, wherein said receiving apparatus comprises acknowledge sending means for transmitting an acknowledgement frame upon said message receiving means correctly receiving a message frame, and wherein said sending apparatus comprises acknowledge receiving means for receiving an acknowledgement frame, is characterised: in that each message frame sent by an end apparatus and comprising an application message further comprises said communication identification of the sending end apparatus; and in that said central apparatus comprises confirmation means for, upon said acknowledge receiving means receiving an acknowledgment frame in response to each message frame transmitted by said central apparatus and comprising said first application message, causing said message sending means to transmit a confirmation message to the end apparatus which sent said first application message. The first apparatus, which sent the initial application message, receives from the central apparatus a special confirmation message, in addition to an acknowledgement frame. The confirmation message indicates that all apparatuses have received the application message. This increases the reliability of the system. Additionally, the first apparatus can use the confirmation message for other purposes as well, such as synchronising the group application.

A further embodiment of a system according to the invention, wherein said receiving apparatus comprises acknowledge sending means for transmitting an acknowledgement frame upon said message receiving means correctly receiving a message frame, and wherein said sending apparatus comprises acknowledge receiving means for receiving an acknowledgement frame, is characterised: in that each message frame sent by an end apparatus and comprising an application message further comprises said communication identification of the sending end apparatus; and in that said confirmation means is conceived to cause said message sending means to transmit a negative confirmation message to the end apparatus which sent said first application message if said acknowledge receiving means does not receive within a predetermined period an acknowledgment frame in response to each message frame transmitted by said central apparatus and comprising said first application message. The use of the negative confirmation ensures that the sending end apparatus is timely informed that not all apparatuses of the group received the application message. This allows the end apparatus to take appropriate action. This mechanism is particularly beneficial, since it would be difficult for the end apparatus to determine when all application messages have been transmitted by the central apparatus, either successfully or unsuccessfully.

A further embodiment of a system according to the invention is characterised in that said message sending means is conceived to transmit a broadcast frame; in that said message receiving means is conceived to receive a broadcast frame; in that said central apparatus comprises construction means for constructing a group of communicating apparatuses by causing said message sending means to transmit a broadcast frame comprising an invitation message inviting end apparatuses to join a group; in that each end apparatus comprises acceptance means for, upon said message receiving means receiving a broadcast frame comprising said invitation message inviting to join a group, verifying whether said invitation to join should be accepted or rejected by said end apparatus and for, if said invitation is to be accepted by said end apparatus, causing said message sending means to transmit a message frame identifying said central apparatus and comprising an acceptance message and the identification of said end apparatus; in that said central apparatus comprises storage means for storing a membership list for each group of apparatuses executing corresponding group applications; said list corresponding to said group and comprising said communication identification of each apparatus of said group; and in that said construction means is further conceived to store for each received message frame, which comprises an acceptance message and the identification of an end apparatus, said identification in the membership list which corresponds to the group being constructed. By broadcasting an invitation message inviting all apparatuses to join a group and registering the communication identification of the apparatuses which respond positively, a group is established efficiently, without requiring any pre-knowledge of apparatuses present in the system. If required, an end apparatus may involve the user of the apparatus in determining whether to join or not.

A further embodiment of a system according to the invention is characterised in that said invitation message comprises an identification of a group application; and in that said acceptance means further verifies whether the group application identified in the received invitation message should be executed by said end apparatus and, if so, causing said execution means to execute said application. By informing the end apparatuses which group application is being started, the end apparatuses can better determine whether to join the group.

A further embodiment of a system according to the invention is characterised in that said end apparatus comprises initiative means for causing said message sending means to transmit an initiative message to said central apparatus indicating that said end apparatus wishes to execute a group application; and in that said construction means is conceived to, upon said message receiving means receiving said initiative message, causing said message sending means to transmit said invitation message. In this embodiment, the end apparatus takes the initiative to start a group application. Particularly if the end apparatus takes the initiative in response to a trigger of the user of the apparatus, advantageously, a group is established when required by a user.

A further embodiment of a system according to the invention is characterised in that said initiative message comprises an identification of a group application, which the end apparatus wishes to execute; and in that said construction means is conceived to use said group application identification in the received initiative message as the group application identification in said invitation message. Advantageously, the end apparatus which takes the initiative to form a group informs the central apparatus which application is involved. The central apparatus distributes this information to the other apparatuses.

A further embodiment of a system according to the invention is characterised in that said central apparatus comprises storage means and display means; said storage means storing at least one membership list; said list comprising identifications of end apparatuses executing corresponding group applications and forming a group; said display means displaying said membership list and its identifications of end apparatuses; in that said end apparatus comprises selection means for causing said message sending means to transmit a message frame identifying said central apparatus and comprising a message requesting to join a selected group and the identification of said end apparatus; in that said central apparatus comprises updating means for, upon receiving a message requesting to join a selected group and the identification of an end apparatus, adding said end apparatus to a membership list, which corresponds to said selected group, and causing said display means to update the display of said membership list. By displaying a membership list and the identifications of the member end apparatuses on the display of the central apparatus, the user of an end apparatus can easily determine whether or not to join a specific group.

A further embodiment of a system according to the invention is characterised in that each end apparatus is conceived to participate in at most one group at a time; in that each message frame sent by an end apparatus and comprising an application message further comprises said communication identification of the sending end apparatus; and in that for a received message frame comprising an application message said group resolution means determines said group of end apparatuses by extracting the communication identification of the sending end apparatus from the received message frame and by locating among said membership lists a list which comprises said extracted identification. By limiting the participation of an end apparatus to at most one group at a time, the central apparatus can use the communication identification of the sending apparatus to determine for which group the message is intended.

A further embodiment of a system according to the invention is characterised in that at least one end apparatus is conceived to participate simultaneously in a plurality of groups; in that said storage means stores for each membership list a corresponding group identification; said group identification uniquely identifying a group within said system; in that each message frame comprising an application message further comprises said communication identification of an end apparatus and one of said group identifications; and in that for a received message frame comprising an application message said group resolution means determines said group of end apparatuses by extracting said group identification from the received message frame and by locating among said membership lists a list which corresponds to a group corresponding to said group identification. By using a group identification, with a system-wide meaning, in combination with the communication identification, the central apparatus can determine for which group the message is intended, allowing an apparatus to participate in more than one group at a time.

A further embodiment of a system according to the invention is characterised in that at least one end apparatus is conceived to participate simultaneously in a plurality of groups; in that for each membership list said storage means stores a sub-identification for each end apparatus on said list; said sub-identification uniquely identifying a group within said end apparatus; in that each message frame comprising an application message further comprises said communication identification of an end apparatus and one of said sub-identifications for said end apparatus; in that for a received message frame comprising an application message said group resolution means determines said group of end apparatuses by extracting the communication identification and the sub-identification of the sending end apparatus from the received message frame and by locating among said membership lists a list which comprises said extracted identifications. The sub-identification identifies the group within the apparatus. Based on the communication identification in combination with the sub-identification, the central apparatus can determine for which group the message is intended, allowing an apparatus to participate in more than one group at a time.

A further embodiment of a system according to the invention is characterised in that at least one end apparatus is conceived to participate simultaneously in a plurality of groups; said apparatus comprising a plurality of said communication identifications, where each communication identification within said apparatus corresponds to one of said plurality of groups and each communication identification is unique within said system; in that each message frame sent by an end apparatus and comprising an application message further comprises a selected one of said communication identifications of the sending end apparatus; and in that for a received message frame comprising an application message said group resolution means determines said group of end apparatuses by extracting the selected communication identification of the sending end apparatus from the received message frame and by locating among said membership lists a list which comprises said extracted identification. By assigning to an apparatus more than one communication identification, each being unique within the system, and by associating each communication identification with a group, an apparatus can efficiently participate in more than one group at a time.

A further embodiment of a system according to the invention is characterised in that said system comprises a first subsystem and a second subsystem; said first subsystem comprising said end apparatuses and said central apparatus; said second subsystem comprising a further end apparatus and a relay apparatus; in that said relay apparatus is a sending apparatus as well as a receiving apparatus; in that said relay apparatus and said central apparatus are connected via a further communication medium; in that said central apparatus and said relay apparatus comprise second message sending means for sending a message via said further communication medium and second message receiving means for receiving a message transmitted via said further communication medium; in that said group resolution means is conceived to, if said group of end apparatuses comprises a second apparatus of said second subsystem, cause said second message sending means to transmit to said relay apparatus a relay message comprising said first application message and indicating said communication identification of said second apparatus; in that said relay apparatus comprises relay means for, upon said second receiving means receiving said relay message, causing said first message sending means to transmit said first application message to an end apparatus indicated by said communication identification in said relay message; in that said relay means is conceived to, upon said message receiving means receiving a second application message from a third one of said end apparatuses, causing said second message sending means to transmit a second relay message comprising said second application message and indicating said communication identification of said third apparatus; and in that said group resolution means is conceived to, upon said second message receiving means receiving said second relay message, determining a group of end apparatuses for which said second application message is destined and for causing said message sending means to transmit said second application message to each end apparatus of said first subsystem, which is a member of said group.

By using a relay apparatus connected to the central apparatus, the scope of the group can be extended beyond the limitations of the wireless communication medium. As an example, using infra-red communication, subsystems located in a large room can be located further apart than allowed by the normal operating distance of the infra-red communication used by the end apparatus. Advantageously, the subsystems can be located in different rooms, for instance by using a telecommunication network to connect the central apparatus and the relay apparatus.

BRIEF DESCRIPTION OF THE DRAWINGS

These and other aspects of the invention will be apparent from and elucidated with reference to the embodiments shown in the drawings.

DETAILED DESCRIPTION OF THE INVENTION

Figure 1:
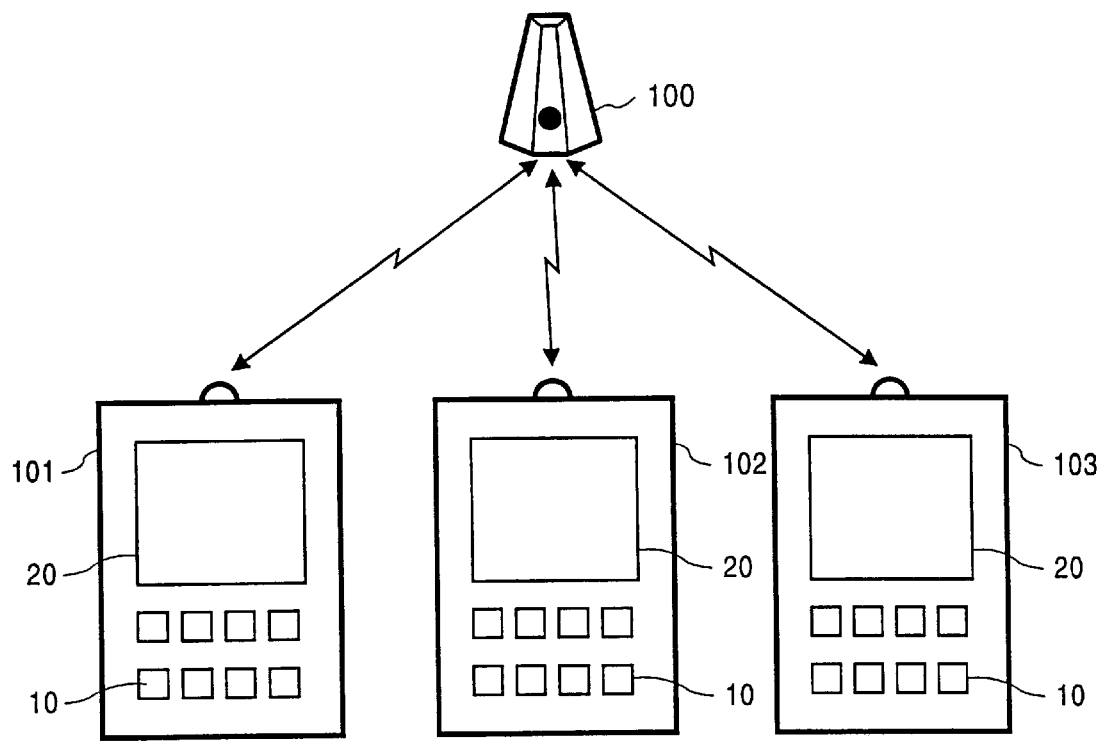
FIG. 1 illustrates a system comprising a plurality of end apparatuses, communicating via a central apparatus.

FIG. 1 illustrates a system according to the invention. The system comprises a central apparatus 100 and at least three end apparatuses. FIG. 1 shows three end apparatuses 101, 102 and 103. Each end apparatus can communicate bi-directionally with the central apparatus using message frames. The communication is wireless; preferably via infra-red. The end apparatuses can form a group of apparatuses which each execute the same or a corresponding group application. The group may include some or all of the end apparatuses. The central apparatus ensures that an application message sent by one of the group members is distributed to all members. As such, communication effectively takes place between the end apparatuses with the assistance of the central apparatus.

The described system is particularly suited for hand-held communicators. For instance, a group of children, each having a hand-held game computer, can play a group game, by each child providing local input into his game computer and his game computer communicating the relevant information to the other game computers. Moreover, the system also enables children to work together as a team, with each child contributing to the task which the team wants to solve. As an example, the children could solve a complex puzzle, by each child solving part of the puzzle on his game computer and these partial solutions being communicated by his game computer to the other game computers. As another example, a Personal Digital Assistant (PDA) can be extended with various applications, which benefit from group communication. Such a PDA could allow a child to enter a note and send it to the PDAs of all friends in the same room.

It will be recognised that the described system is particularly suited for these various types of group applications. The simplicity of the described communication system allows cost-effective implementation of the end apparatuses, which is very important for game computers and children's PDAs.

Besides being equipped for infra-red communication, the end apparatuses of FIG. 1, typically, comprise input means 10, such as a keypad, and a display 20, such as an LCD display. Preferably, for the display 20 a graphics tablet is used, which also allows input via a pen or finger-presses.

Figure 2:
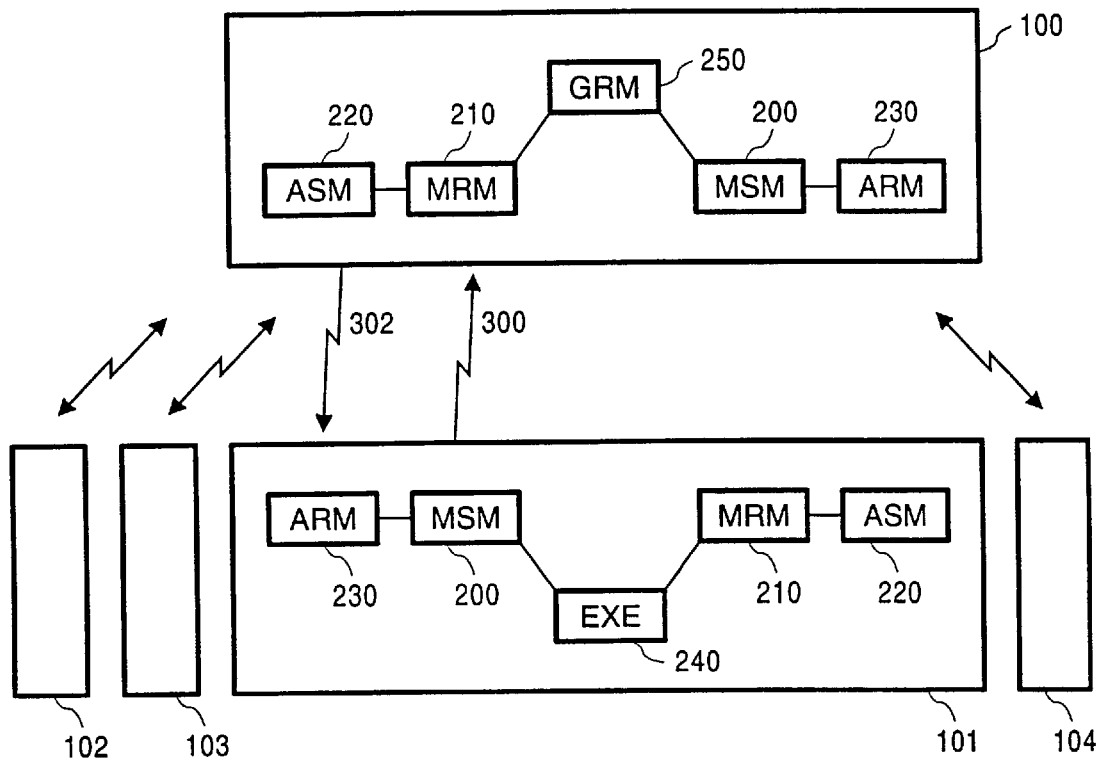
FIG. 2 shows a block-diagram of a first embodiment of a central apparatus and an end apparatus for a system according to the present invention.

FIG. 2 illustrates a block-diagram of a central apparatus 100 and an end apparatus 101 for a system according to the present invention. The system of FIG. 2 further comprises end apparatuses 102, 103 and 104. Since all end apparatuses are the same with regard to communication aspects, no details are shown of the end apparatuses 102, 103 and 104. Each apparatus comprises message sending means 200 for transmitting a message and message receiving means 210 for receiving a message destined for the apparatus. Usually, messages are transmitted in the form of a message frame. In order to improve the reliability of the communication between two apparatuses, the apparatuses may optionally comprise acknowledge sending means 220 for transmitting an acknowledgement frame when the message receiving means 210 correctly receives a message frame, and acknowledge receiving means 230 for receiving an acknowledgement frame. As an example, the acknowledgement mechanism may provide information that optical contact may be lost. By reporting the error to the user of the end apparatus, the user can reestablish contact by better pointing the end apparatus at the central apparatus.

Figure 3A:
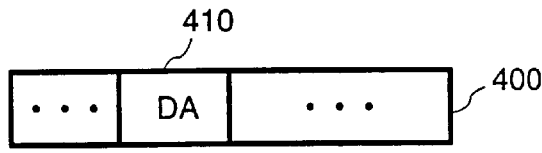
FIG. 3A–C shows structures of a communication frame.

Each apparatus comprises a communication identification, which identifies the apparatus with respect to the infra-red communication medium. A transmitted message frame identifies the apparatus for which the message frame is intended. The message receiving means 230 of an apparatus receives a message frame if the message frame identifies the apparatus. Various mechanisms may be used for identifying an apparatus. It is well known to use for an apparatus a communication address which is unique within the system. The unique address may already have been assigned during the manufacture of the apparatus. Alternatively, a unique address may have been assigned automatically, during initialisation of the system or assisted by the user. FIG. 3a illustrates a message frame 400 comprising a destination address (DA) field 410. The sending apparatus ensures that the address of the destination apparatus (receiving apparatus) is included in this field. In principle, the message receiving means 210 of all apparatuses may receive the beginning of the message frame and verify whether the address specified in the destination address (DA) field 410 matches the address of the apparatus. If so, the message frame is received in its entirety.

Figure 3B:
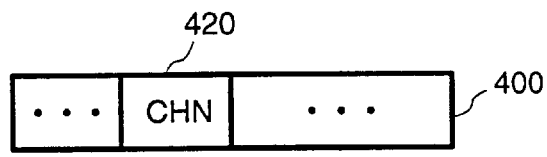
Figure 3C:
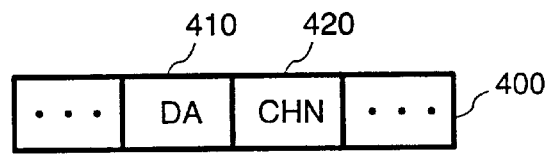

As an alternative to using communication addresses, communication channels may be used for identification. The communication between a pair of apparatuses, such as an end apparatus and the central apparatus, may be assigned a communication channel, which at that moment differentiates the communication between those two apparatuses from the communication between other pairs of apparatuses. A communication channel may be created using, for instance, techniques such as frequency division multiplexing, where each channel corresponds to a different frequency. FIG. 3b illustrates a message frame 400 for a system which uses channels based on time division multiplexing. A channel (CHN) field 420 is used to carry the channel identification. The sending apparatus ensures that the channel, which identifies the pair of the sending apparatus and the receiving apparatus is included in this field. In principle, the message receiving means 210 of all apparatuses may receive the beginning of the message frame and verify whether the channel specified in the channel (CHN) field 420 matches a channel of the apparatus. If so, the message frame is received. It should be noted that in general an apparatus may have a number of active channels via which it communicates in 'parallel' to, for instance, different apparatuses. Typically, channels are assigned dynamically, implying that the set of active channels within an apparatus may change in time. The prior patent application U.S. patent application Ser. No. 08/673,882, filed Jul. 1, 1996 (PHN 15352). herein included by reference, describes methods for assigning channels. Usually, a channel, which is no longer used, can be reused by another pair of apparatuses. Since in the system according to the invention different types of apparatuses are used, such as a central apparatus and end apparatuses, it may be desired to be able to easily differentiate between the various types. Advantageously, this is achieved by assigning different, fixed addresses to each type of apparatus. So, the central apparatus 100 has a different address then the end apparatuses 102, 103 and 104, which each have the same address. This has the advantage that no assigning of addresses during manufacturing or automatic assignment is required. Moreover, existing infra-red communication protocols, such as for instance used for remote controls, can be used where only a limited number of addresses need to be reserved for apparatuses according to the invention. In addition to the address, communication channels can be used to further differentiate between the end apparatuses. As such the combination of the address and the channel forms the communication identification identifying an apparatus. FIG. 3c shows a message frame 400 which comprises a destination address (DA) field 410 as well as a channel (CHN) field 420. The sending apparatus ensures that the address of the destination apparatus (receiving apparatus) is included in the destination address (DA) field 410 and that the channel, which identifies the pair of the sending apparatus and the receiving apparatus, is included in the channel (CHN) field 420. The message receiving means 210 receives a message frame if the address specified in the destination address field 410 matches the address of the apparatus and if the channel specified in the channel field 420 matches an active channel of the apparatus.

As shown in FIG. 2, each end apparatus further comprises execution means 240 for executing a group application. During the execution of a group application, the executing means 240 communicates to executing means in other end apparatuses, which execute a corresponding group application. The communication takes place by exchanging message frame comprising application messages. In many cases the group application executed by the members of the same group will be the same. As an example, four apparatuses may form a group working on the same drawing. The group application being executed locally accepts local input, for instance on a graphical tablet, displays the result locally and transmits the input to the other group members. The local group application also receives the input entered on the other end apparatuses which are a member of the group and the local group application also displays the result of this. As another example, apparatuses may be playing a football game, which is displayed on each apparatus. Each user of an apparatus controls one of the players. The results of local input is displayed on all displays. In such a case, the group application executed on each machine will, typically, be the same, although performing different roles. It will be appreciated that for certain applications, the roles may be fundamentally different, resulting in some apparatuses executing a different application than other apparatuses, where the different applications still correspond to each other. As an example, the role of a dealer in a card game may be performed by executing a different application than is executed for performing the role of a normal player in the card game.

The communication between the end apparatuses of the same group takes place via the central apparatus. As an example, in FIG. 2 the end apparatuses 101, 102 and 103 form a group of apparatuses executing the same group application. At a certain moment while executing the group application, the executing means 240 of end apparatus 101 prepares an application message to be transmitted to the other end apparatuses of the group. The message may, for instance, be generated by the end apparatus at that moment or, alternatively, be retrieved from memory in the apparatus, in which the message had been stored in advance. The execution means 240 uses the message sending means 200 to transmit the application message to the central apparatus 100. Using a conventional message frame, the execution means 240 inserts the communication identification of the central apparatus in the message frame together with the application message. The message frame 300 is received by the message receiving means 210 of the central apparatus 100. The message receiving means 210 verifies whether the message has been received correctly. Various methods are known for this, such as checking the bit timing (e.g. bi-phase encoding), checking whether the parity matches parity bits comprised in the message frame or checking whether a calculated checksum, such as a CRC, matches the checksum comprised in the message frame. Based on such a method, the message receiving means 210 may conclude that the message frame was not received correctly and discard the frame. If no error has been detected, the optional acknowledge sending means 220 may be used to return an acknowledgement frame 302. The acknowledgement frame 302 may be received by the acknowledge receiving means 230 of apparatus 101. If the acknowledge receiving means 230 do not receive an acknowledgement frame within a predetermined time frame, the message sending means 200 may retransmit the message frame a number of times in order to increase the reliability of the system.

In the example of FIG. 2, the message receiving means 210 of the central apparatus 100 correctly receives the message frame 300 transmitted by end apparatus 101. The central apparatus 100 comprises a group resolution means 250 for determining for which group of end apparatuses the application message is intended. In the example, the group is formed by apparatuses 101, 102 and 103. The group resolution means 250 ensures that each of the apparatuses of the group receives the application message by sending a message frame to each apparatus. The message frame comprises the application message received by the central apparatus 100. In a simple system, the group resolution means may also send the message back to the sending end apparatus 101. In this case, the end apparatus 101 may discard this message. The end apparatus 101 will, in general, be able to distinguish between a copy of its own application message and an application message initiated by another end apparatus by comparing the received application message to the transmitted application message. Alternatively, the group resolution means 250 may be able to determine which end apparatus sent the application message. In this case, advantageously, the same message is not sent back to the end apparatus 101. In the example, this implies that a message frame is only sent to end apparatus 102 and 103. Various methods are known for informing the group resolution means 250 which end apparatus sent the application message. Using the frame structure of FIG. 3A or 3C, for instance, a source address (SA) field comprising the address of the sending apparatus may be included in the frame (not shown). Using the frame structure of FIG. 3B, channel (CHN) field 420 identifies the pair of the end apparatus and the central apparatus and, therefore, the sending end apparatus is known to the central apparatus. Alternatively, the sending apparatus may include its identity in the application message. This has the additional advantage that end apparatuses for which the application message is intended will also be able to detect the identity of the end apparatus which initiated the application message, since the central apparatus copies the application message.

Figure 4:
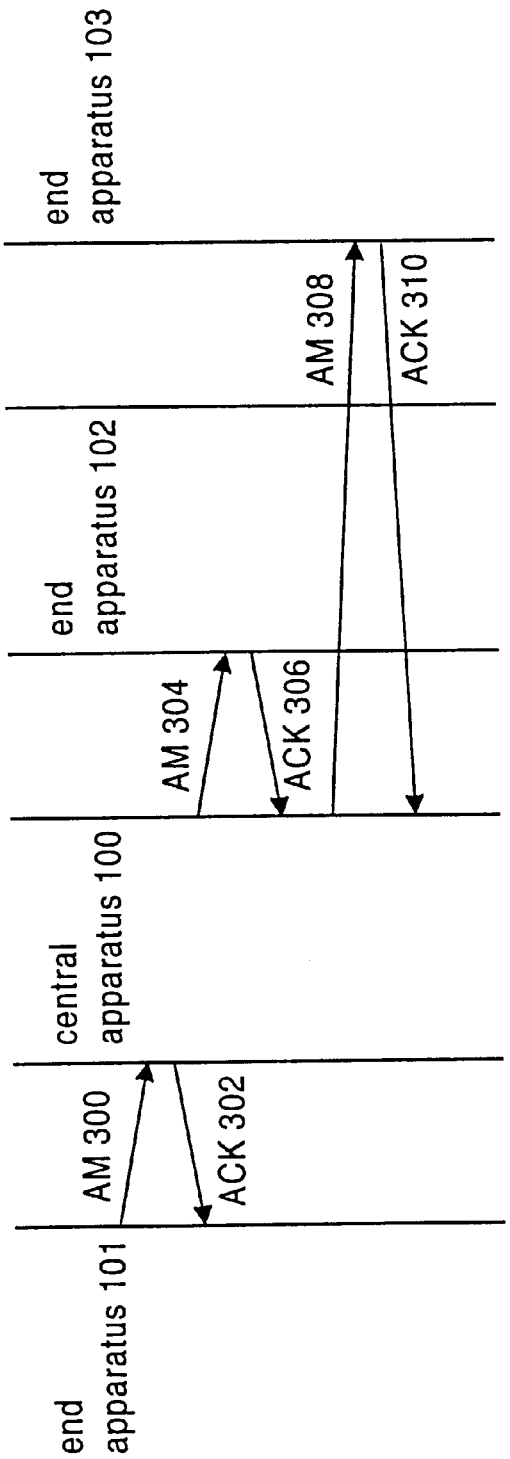
FIG. 4 illustrates the message exchange between the apparatuses.

FIG. 4 shows a flow-chart for the exchange of message frames in the described example. In the flow-chart it is assumed that the group resolution means 250 is able to determine that end apparatus 101 sent the application message 300. As described earlier, the central apparatus 100 may return an acknowledgement frame 302 to end apparatus 101. The group resolution means 250 transmits a message frame 304 to end apparatus 102 and a message frame 308 to end apparatus 103. If end apparatus 102 receives the message frame 304 correctly, it may return an acknowledgement frame 306. If end apparatus 102 receives the message frame 308 correctly, it may return an acknowledgement frame 310. It will be appreciated that the group resolution means 250 may deal with the message frames and acknowledgment frames for each apparatus sequentially as well as in parallel, depending on the used communication protocols.

As an alternative to using message frames, in an alternative embodiment use is made of broadcast frames for exchanging messages. To this end, the message sending means 200 is able to transmit a message in a broadcast frame and the message receiving means 210 is able to receive a message in a broadcast frame. A transmitted broadcast frame is, in principle, received by all apparatuses able to receive frames at that moment. After receiving, via the message receiving means 210, an application message from an end apparatus, the group resolution means 250 constructs a broadcast frame with the received application message. The group resolution means 250 then uses the message sending means 200 to transmit the broadcast frame to the end apparatuses of the group. The broadcast frame may be received by all or a selection of apparatuses in the system. If the broadcast frame is received by all apparatuses, the apparatuses which are not a member of the group discard the received message. This can be achieved in various ways. One possibility is that, since such an apparatus does not execute the group application, it may not be able to process the message at all, which effectively results in discarding the message. Alternatively, an indication of the group is inserted in the message, based on which an apparatus can determine whether it should process the message or not.

Figure 5:
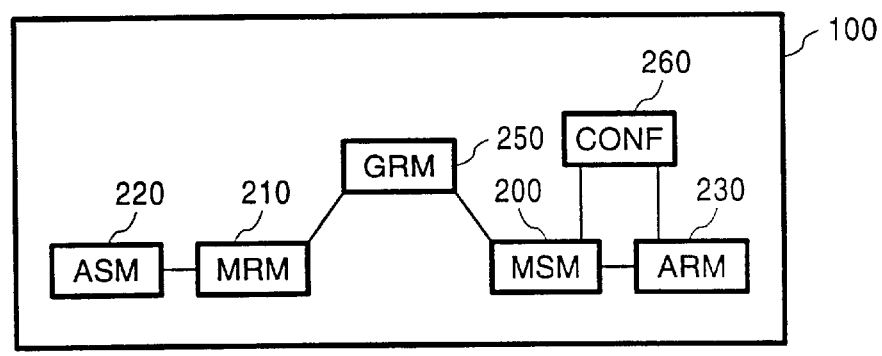
FIG. 5 shows a block diagram of a second embodiment of a central apparatus.
Figure 6:
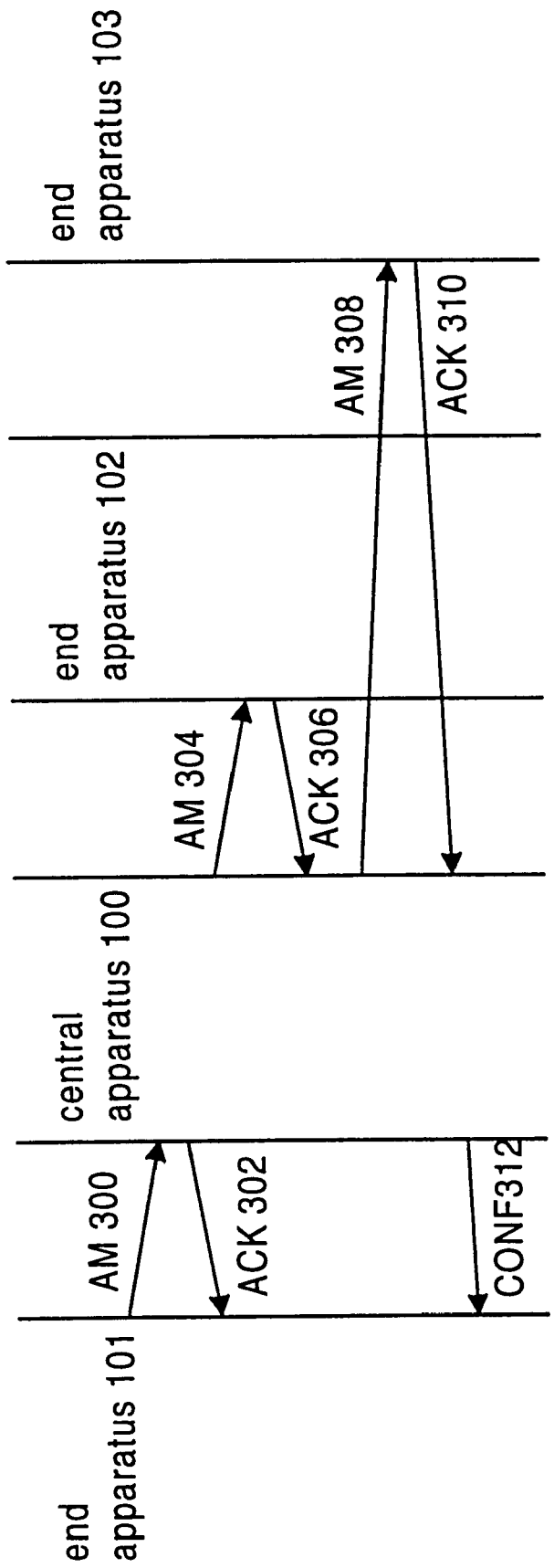
FIG. 6 illustrates the message exchange for the second embodiment.

In a further embodiment as shown in FIG. 5, the central apparatus 100 comprises confirmation means 260. The confirmation means 260 registers for each transmitted message frame (in the example, message frame 304 and 308) initiated by the group resolution means in response to a received application message (in the example, message frame 300) whether an acknowledgement frame has been received. For this embodiment the optional acknowledgement scheme is used. When the acknowledgment frames (in the example, acknowledgement frames 306 and 310) have been received, the confirmation means 260 uses the message sending means 200 to transmit a confirmation message 312 to the end apparatus which sent the message frame 300 with the application message, as illustrated in FIG. 6. The confirmation means 260 determines the identity of the sending end apparatus from information in the message frame, as described earlier. In the end apparatus receiving the confirmation message, the confirmation message will typically be dealt with by the execution means 240. The execution means can use this information for various purposes, such as synchronising the communication or for improving the communication reliability even further by using a high level recovery mechanism.

Figure 7:
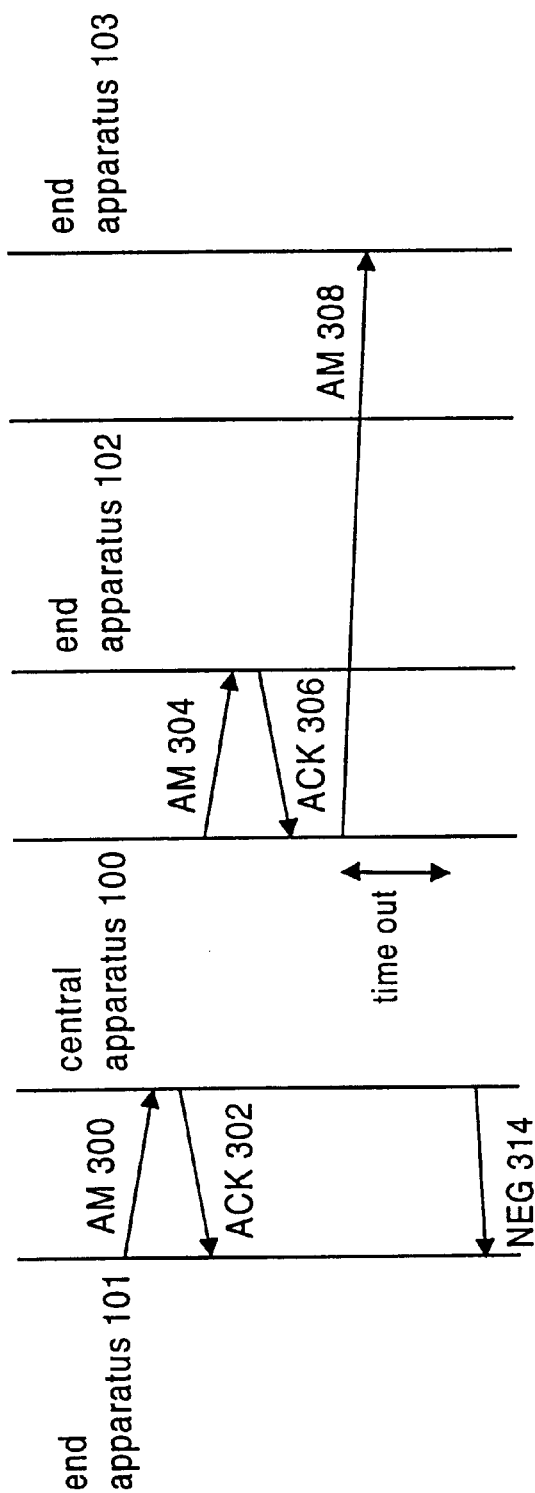
FIG. 7 illustrates a further message exchange.

FIG. 7 shows a flow-chart of the message exchange in a further embodiment according to the invention. In this embodiment, the confirmation means 260 uses the message sending means 200 to transmit a negative confirmation message 314 to the end apparatus, which sent the application message to the central apparatus, if the acknowledgement frames are not received within a predetermined period (time-out). The period may be chosen to be slightly longer than the period used for transmitting and trying to retransmit a message frame to an apparatus. In this embodiment, the central apparatus 100 can inform the sending end apparatus of an error as soon as the error is detected. This has the advantage that the end apparatus is not delayed unnecessarily.

Figure 8:
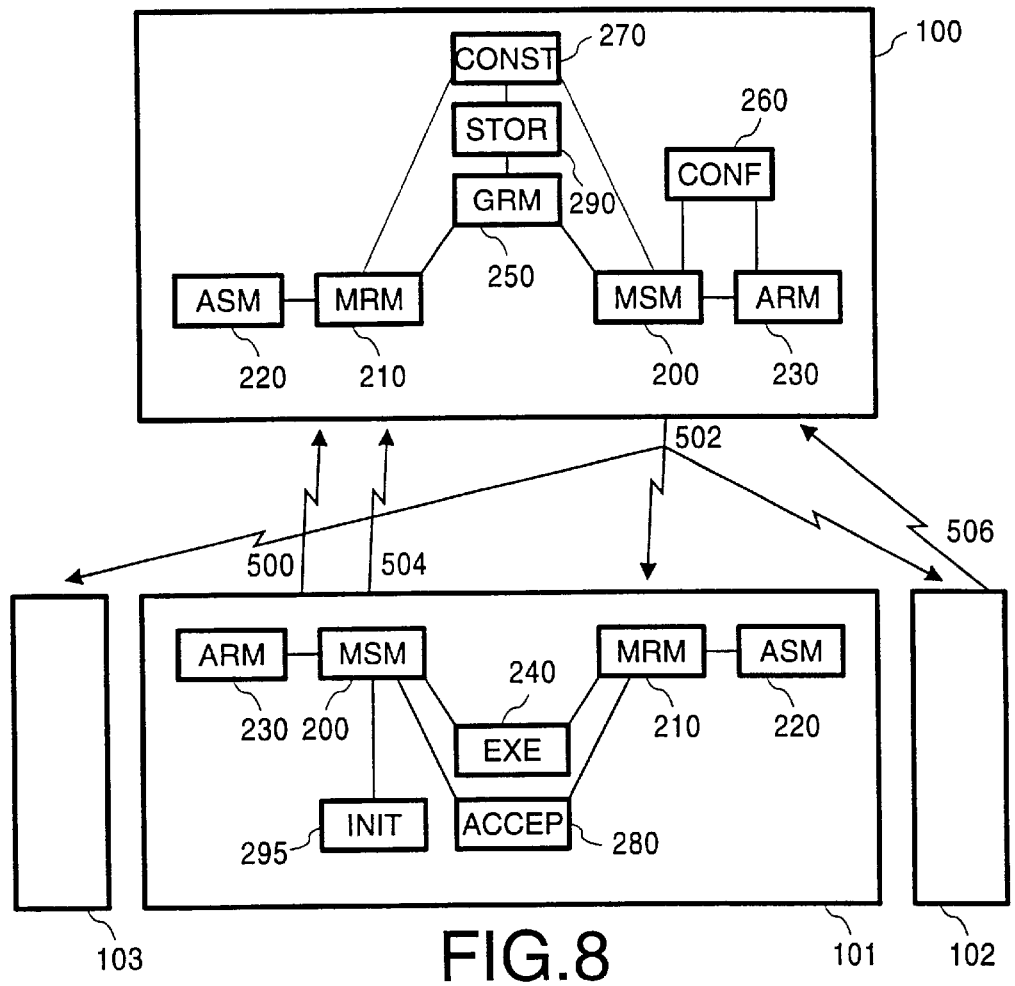
FIG. 8 shows a block diagram of a further embodiment of the central apparatus and the end apparatus, FIG. 9 illustrating a further message exchange.

In a further embodiment according to the invention, as shown in FIG. 8, the central apparatus 100 comprises construction means 270 for constructing a group of communicating apparatuses. To this end, the construction means 270 uses the message sending means 200 to transmit a broadcast frame 502 comprising an invitation message inviting end apparatuses to join a group. The invitation message may, optionally, comprise an identification of the group application to be executed by the group of apparatuses being formed. In FIG. 8, the broadcast frame is received by end apparatuses 101, 102 and 103. The communication protocol used for transmitting the broadcast frame may or may not include an acknowledgement scheme. By using a broadcast frame the central apparatus can in one operation invite all active apparatuses able to receive at that moment. There is no need for the central apparatus to register which end apparatuses are present in the system and may need to be invited. This is particularly advantageous in a system where portable apparatuses may dynamically come and go and where, even if the apparatus is within the permitted communication range, communication may temporarily be impossible if the user of the apparatus does not maintain optical contact. FIG. 8 shows details of end apparatus 101. The message receiving means 210 of end apparatus 101 passes the received broadcast frame 502 to acceptance means 280. The acceptance means 280 verifies whether the invitation in the broadcast frame should be accepted or rejected by the end apparatus. Typically, this involves an interaction with the user of the apparatus. Alternatively, the end apparatus may have been programmed to always accept certain invitations. If the invitation message contains an identification of the group application, advantageously, the acceptance means 280 may use this information to verify whether to join. As an example, the information may be displayed to the user, enabling the user to better decide whether to join or not. If the invitation is to be accepted, the acceptance means 280 uses the message sending means 200 to transmit a message frame 504 with an acceptance message. The message frame is sent to the central apparatus. For the central apparatus being able to determine which end apparatus accepted the invitation, the message frame with the acceptance comprises an identification of the accepting end apparatus. In the example of FIG. 8, also end apparatus 102 send an acceptance message 506. End apparatus 103 does not send an acceptance message. The central apparatus 100 may close the opportunity of joining a group after a predetermined time. Such a time would have to consider the normal transmission times (including error recovery) and normal processing times. It may also include time for the user of an end apparatus to decide whether or not to join. Alternatively, the central apparatus may leave it open for an end apparatuses to accept as soon as the end apparatus is ready. The end apparatus may repeat the invitation process several times or even continuously. The central apparatus 100 may also close the opportunity to join after a predetermined number of apparatuses have joined. This may, for instance, happen if the group application is restricted to a predetermined number of participants. Advantageously, the central apparatus 100 informs end apparatuses whether they were accepted or not as members of the group.

For each group of apparatuses, executing corresponding group applications, the central apparatus 100 stores a membership list in storage means 290. The membership list of a group comprises the communication identification of each apparatus which is a member of the group. The construction means 270 stores for each received acceptance message the communication identification of the accepting end apparatus in the membership list which corresponds to the group being constructed. The membership list is used by the group resolution means 250 to determine which apparatuses are a member of a group.

Figure 9:
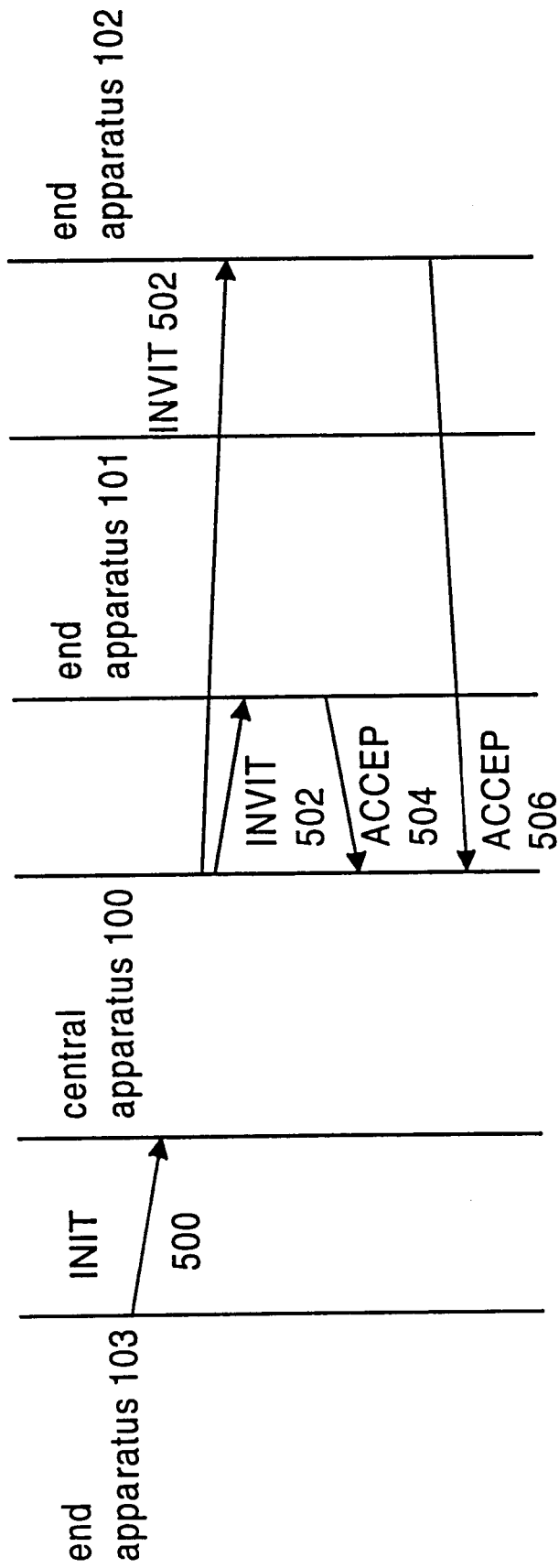

In a further embodiment an end apparatus comprises initiative means 295 for initiating the establishment of a group, as shown in FIG. 8. The initiative means 295 use the message sending means 200 to transmit a message frame 500 with an initiative message to the central apparatus 100. In response the construction means 270 of the central apparatus broadcasts the invitation message 502, as described earlier. FIG. 9 shows a flow-chart of the message exchange, where end apparatus 103 sends the initiative message 500, the central apparatus broadcasts the invitation message 502, end apparatus 101 returns an acceptance message 504, and end apparatus 102 also returns an acceptance message 506. Since end apparatus 103 took the initiative, the construction means 270 may automatically add end apparatus 103 to the membership list. Optionally, end apparatus 103 may also return an acceptance message. As described earlier, the construction means 270 may send a special confirmation message to the end apparatus which initiated the group to inform the apparatus that a group has been formed. Optionally, the initiative message may comprise an identification of the group application to be executed by the group of apparatuses being formed. If so, the group resolution means 270 can pass this information to the other end apparatuses by inserting the information in the invitation message.

Figure 10A:
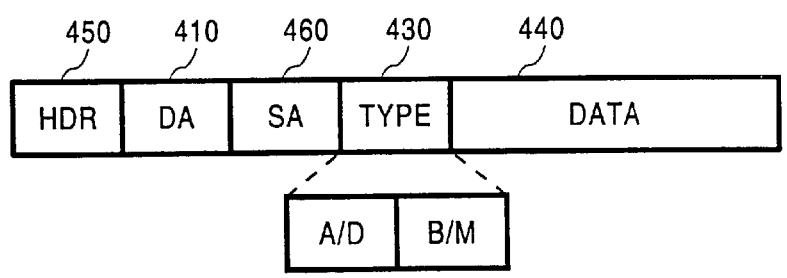
FIG. 10A–C shows more extensive structures of the message frame.
Figure 10B:
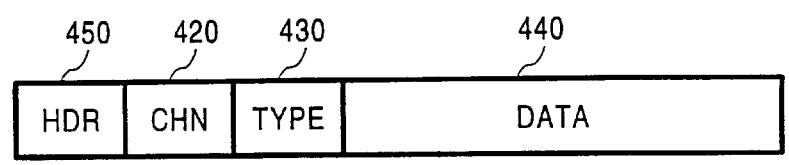
Figure 10C:
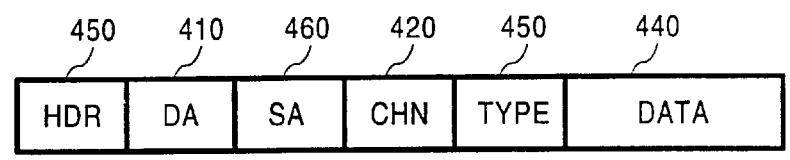

The system uses two types of frames carrying data: a broadcast frame and a message frame. A broadcast frame is intended to be received by the message receiving means 210 of each apparatus in the system. A message frame is intended to be received only by the identified apparatus as described earlier. Furthermore, acknowledgement frames are used. To distinguish between the various types of frames, the frame may comprise a TYPE field 430 as shown in FIG. 10. FIG. 10 provides more details of the frames shown in FIG. 3. The TYPE field 430 may comprise an A/D field and an B/M field. The A/D field is used to distinguish between an acknowledgement frame and a data frame. The B/M field is used to distinguish between the two types of data frames: a broadcast frame and a message frame. In this case it is sufficient to use only one bit for these fields. The type field may include more bits to differentiate between different types of messages, such as an invitation message, an acceptance message or an ordinary application message. The message may be carried in a DATA field 440 of the frame. The DATA field 440 may be able to carry a variable number of data bytes or bits with a maximum of, for instance, 16 data bytes. Instead of a DATA 440 field, an acknowledgement frame may contain an ACK field of, for instance, one bit, to indicate whether the previous message frame was received correctly. The ACK field could, alternatively, be disposed of, using the fact that an acknowledgement frame is received within a defined time window as a positive acknowledgement and that no acknowledgement frame is received as a negative acknowledgement. To simplify clock-synchronisation of the receiving circuit and the detection of the beginning of a frame, a frame may additionally start with a special header HDR field 450, such as a special bi-phase encoded pattern. As described earlier, particularly in the case of using addresses for identification, as shown in FIG. 10a and 10c, the frame may comprise a source address SA field 460 for carrying the address of the sending apparatus. Obviously, many alternative frame structures can be used to achieve the same result. For instance, by reserving one communication channel for broadcast messages (implying that every apparatus should always activate the reserved channel), the frame structure of a group message can also be used for broadcast messages. This makes the B/G field redundant and may simplify the processing of the frames. Furthermore, a channel may be allocated to a group of apparatuses including the central apparatus. As a consequence, a broadcast message, specifying such a channel, is only received by the selected group of apparatuses which have activated the channel. In this way the broadcasting mechanism can be used to multicast a message to a group of apparatuses. The prior patent application U.S. application Ser. No. 08/673,882 filed Jul. 1, 1996 (PHN 15352) describes mechanisms for forming such a group.

In a simple embodiment according to the invention, each end apparatus is limited to participate in at most one group at a time. When the group resolution means 250 receives a message frame with an application message, it extracts the communication identification of the sending end apparatus from the received message frame. Next, the group resolution means 250 searches through the membership list stored in the storage means 290 to locate a list which has the identification of the sending apparatus. Since the apparatus may only be on one list, the located list corresponds to the group for which the message is intended. It will be appreciated that, in time, an end apparatus may be a member of different groups.

In an alternative embodiment, at least one end apparatus is capable of participating in a plurality of groups simultaneously. For the central apparatus to be able to determine to which group a message sent by such an apparatus corresponds, each group is identified by a group identification which is unique within the system. The storage means 290 stores for each membership list the corresponding group identification. A sending end apparatus inserts in the message frame with the application message also the group identification of the group for which the message is intended. The group resolution means 250 in the central apparatus extracts the group identification from the received message frame and locates the corresponding membership list by searching through the lists for a matching group identification. Advantageously, the membership lists are stored in the form of a table, where the group identification is the index to the table.

In an alternative embodiment, an end apparatus uses a sub-identification, in combination with the communication identification, to identify the group within the end apparatus. The scope of the sub-identification needs, therefore, not to be system-wide. Different end apparatuses may use the same sub-identification simultaneously. The end apparatus includes the sub-identification in each message frame with an application message which it sends to the central apparatus. The storage means 290 stores for each membership list the sub-identification of the member end apparatuses. The group resolution means 250 in the central apparatus searches through the membership lists stored in the storage means 290 to locate a list which has the communication identification of the sending apparatus as well as the sub-identification. The sub-identification may be a separate field in the message frame, or may be included in the application message.

In an alternative embodiment, an end apparatus, which simultaneously participates in a plurality of groups, uses a plurality of communication identifications. Each communication identification corresponds to one group. This scheme is particularly advantageous for systems where channels are used for identifying end apparatuses. As an example, an end apparatus, which participates simultaneously in three groups, may use three distinct channels, each channel corresponding to a group. In this way the channel can be seen as simultaneously acting as the communication identification as well as the sub-identification. At any moment in time, the channel is unique within the system. The group resolution means 250 searches through the membership list stored in the storage means 290 to locate a list which has the communication identification specified by the sending apparatus. Since the apparatus only specifies one unique identification in the message frame, the located list corresponds to the group for which the message is intended, although the end apparatus may be on several lists simultaneously.

Figure 11:
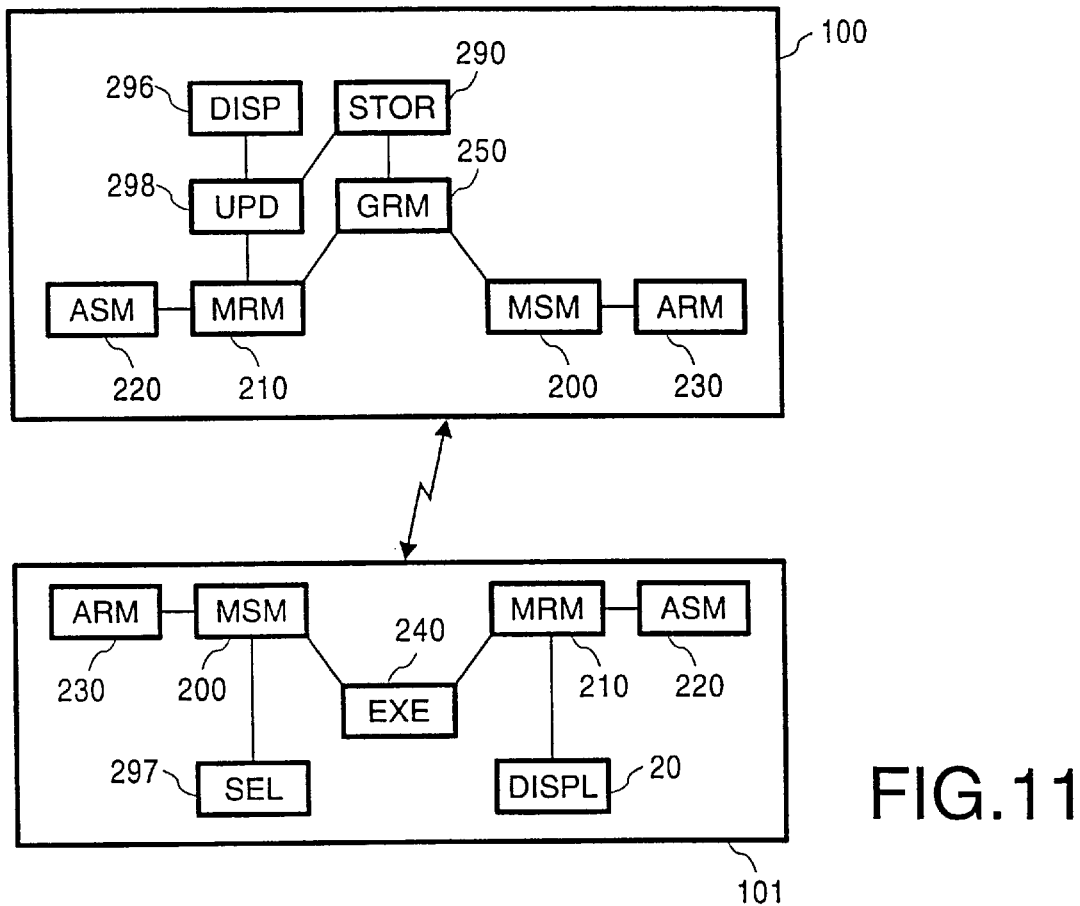
FIG. 11 shows an alternative embodiment of the central apparatus and the end apparatus.

FIG. 11 shows an alternative embodiment, wherein the central apparatus 100 comprises storage means 290 for storing at least one membership list. The list comprises identifications of end apparatuses which form a group by executing corresponding group applications. The central apparatus also comprises display means 296 for displaying the membership list and the identifications of the end apparatuses on the list. The end apparatuses, as shown for end apparatus 101, comprise selection means 297 for selecting a membership list to join. The selection may be performed by means of a dialogue with the user of the end apparatus. As an example, the user may use the end apparatus as a kind of remote control for manoeuvring through the lists displayed by the central apparatus. Once a list has been selected, the selection means 297 uses the message sending means 200 to transmit to the central apparatus 100 a message frame comprising a message requesting to join the selected group. The message frame also comprises the identification of the end apparatus. The central apparatus 100 comprises updating means 298 which adds the end apparatus to the membership list, which corresponds to the selected group. The updating means 298 also ensures that the display means 296 displays the updated membership list. In a simple system where the central apparatus does not comprise any display means, the end apparatus may download the information in the membership lists and display it on its local display 20.

Figure 13:
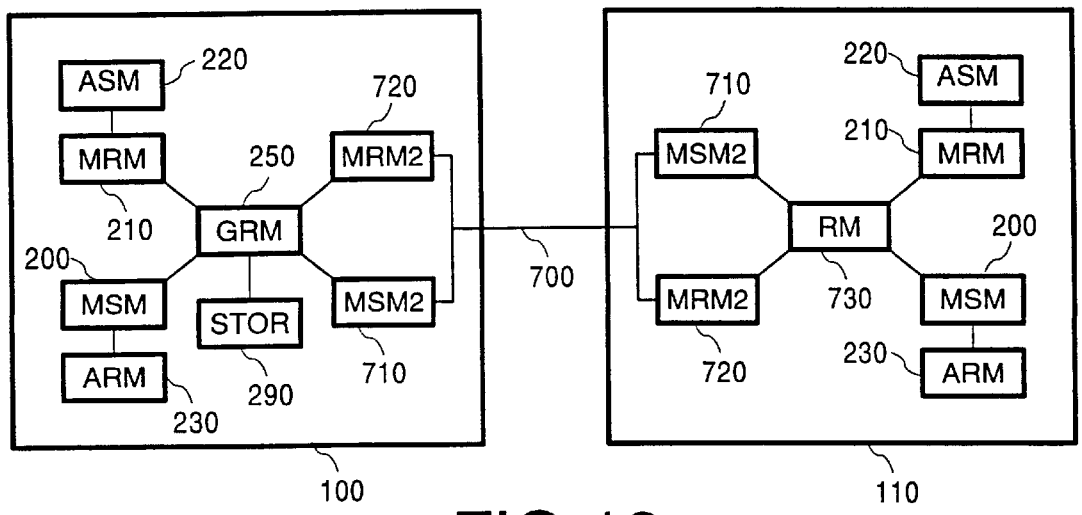
FIG. 13 shows an embodiment of the central apparatus and the relay apparatus for multi-room operation.
Figure 12:
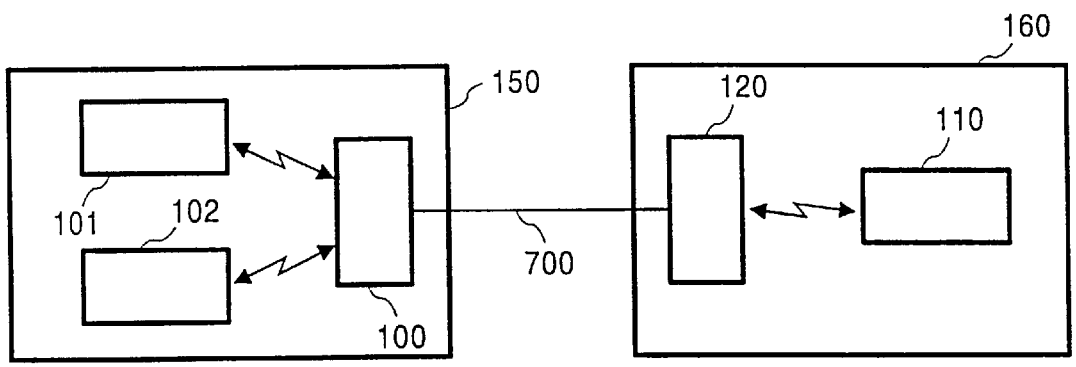
FIG. 12 shows a further embodiment of the system comprising a relay apparatus for multi-room operation.

In a further embodiment as shown in FIG. 12, the end apparatuses (shown are end apparatuses 101 and 102) and the central apparatus 100 constitute a first subsystem. In addition to the end apparatuses in the first subsystem, the system comprises a second subsystem, including a further end apparatus 110. The end apparatus 110 can not communicate directly with the rest of the system, since there is no sufficient contact between the end apparatus 110 and the central apparatus 100. As an example, the subsystems are located in a large room, where the distance between end apparatus 110 and the central apparatus 100 is beyond the operational distance of the infra-red communication. As shown in FIG. 12, alternatively, the first subsystem is located in a first room 150 and the second subsystem is located in a second room 160, implying that no optical contact between end apparatus 110 in the second room 160 and the central apparatus 100 exists. To enable the communication, the second subsystem further comprises a relay apparatus 120. The relay apparatus 120 also comprises message sending means 200, message receiving means 210, acknowledgment sending means 220 and acknowledgement receiving means 230, as shown in FIG. 13. The relay apparatus 120 and central apparatus 100 are connected via a further communication medium 700 for communicating digital data. As an example, such data communication may be provided via a telephone connection or via RF transmission. If both subsystems are located in a large room, the relay apparatus 120 and the central apparatus 100 may even communicate using infra-red communication of a type which is sufficiently strong or directional to cover a large distance. The relay apparatus 120 and the central apparatus 100 comprise second message sending means 710 for sending a message frame via the further communication medium 700 and second message receiving means 720 for receiving a message frame transmitted via the further communication medium 700. Depending on the reliability of the communication medium 700 also acknowledgement schemes may be used.

End apparatuses located in different subsystems can communicate via the central apparatus 100 and the relay apparatus 120. As such the group can be extended to also include apparatuses located in the second subsystem in addition to apparatuses located in the first subsystem. In such a situation, if the group resolution means 250 receives an application message from an end apparatus in the first subsystem, then the group resolution means 250 ensures that the application message is also sent to the end apparatus in the second subsystem, if that apparatus is a member of the group. To this end, the group resolution means 250 uses the second message sending means 710 to transmit a relay message to the relay apparatus 120. The relay message contains the application message which was sent to the central apparatus 100. The relay message also indicates the communication identification of the end apparatus 110, which is in the second subsystem. The relay apparatus 160 comprises relay means 730. When the relay means 730 receives a relay message via the second message receiving means 720, it extracts the application message and the communication identification from the relay message and uses the first message sending means 200 to transmit the application message to the indicated end apparatus. It will be appreciated that if the second subsystem includes more than one apparatus being a member of the group, the group resolution means 250 may include more than one identification in the relay message.

In the situation where the sending apparatus is in the second subsystem, the relay means 730 receives via the message receiving means 210 an application message from the sending apparatus. The relay means 730 uses the second message sending means 710 to transmit a relay message frame to the central apparatus 100. The relay message contains the application message and sufficient information for the group resolution means 250 to determine for which group the application message is intended. The group resolution means 250 receives the relay message via second message receiving means 720. Based on the supplied information the group resolution means 250 determines the group of end apparatuses for which the received application message is intended and uses the message sending means 200 to transmit the application message to each apparatus of the first subsystem, which is a member of the group.

Depending on the type of the further communication medium 700, additional information may need to be stored in the storage means 290 for the group resolution means 250 to be able to relay messages. As an example, if telephone lines are used the telephone number via which the relay apparatus 160 can be reached needs to be stored. If the second subsystem comprises only one end apparatus, no further communication identification for the end apparatus may be required. In general, however, the telephone number is stored in addition to the communication identification. Also depending on the type of the further communication medium and any limitations on taking the initiative for establishing communication, the relay apparatus 120 may also need to store additional information, such as the telephone number of the central apparatus. It will be appreciated that in a very flexible system the relay apparatus 120 may have the same functionality as the central apparatus 100. In such a system, the information present in the central apparatus 100 needs to shared with the relay apparatus 120. It is well known how this can be achieved.

It will be appreciated that the described concept can easily be extended to cover more than two subsystems. Furthermore, each subsystem may comprise a plurality of end apparatuses.

Both the message sending means 200 and the acknowledgement sending means 220 transmit frames using infra-red communication. Obviously, both means can partly be combined. For instance, advantageously an encoding circuit and a modulation circuit can be shared, where the encoding circuit is used for encoding the frame into, for instance, a bi-phase signal and the modulation circuit is used for transmitting an infrared light signal onto which the encoded signal is modulated. Typically, the modulation involves modulating the signal onto a subcarrier, which is typically in the range of 33 to 40 KHz., and subsequently modulating the subcarrier onto the infrared carrier. Similarly, the message receiving means 210 and the acknowledge receiving means 230 can share a demodulation circuit for receiving the infrared light signal and demodulating it into an encoded signal. The message receiving means 210 and the acknowledge receiving means 230 can, further, share a decoding circuit for decoding the received encoded signal into a frame. Particularly, if the end apparatus already comprises a micro-controller, for example of the type R3000 of MIPS Computer Systems Inc., it is advantageous to combine the message sending means 200, the message receiving means 210, the acknowledge sending means 220, the acknowledge receiving means 230, the execution means 240, the acceptance means 280, the initiative means 295 and the selection means 297 with the micro-controller. Similar combinations are possible fro the central apparatus 100 and the relay apparatus 110.

Figure 14:
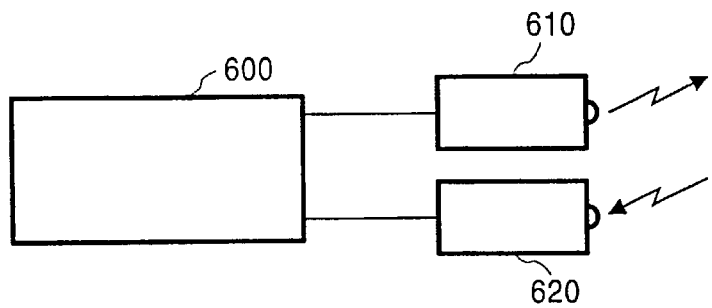
FIG. 14 shows a block-diagram of a micro-controller-based implementation.

FIG. 14 shows an implementation of an end apparatus using a micro-controller. A micro-controller 600 uses a modulation circuit 610 for modulating a subcarrier on an infrared light signal. An example of such a modulation circuit, also referred to as infrared LED, is LD2475 of the Siemens AG. A demodulation circuit 620 receives the infrared light signal and demodulates it into a digital signal, which is supplied to the micro-controller 600. An example of such a demodulation circuit is TFNS 5360 of the Telefunken AG. In practice, the modulation and demodulation circuits are kept separate from the micro-controller. In situations where the real-time requirements of the micro-controller allow for this, it is advantageous to combine the first modulation step (modulating the signal onto a subcarrier) with the micro-controller.

Advantageously, the central apparatus 100 is combined with a multi-media computer, such as a Philips CD-i player. Since such a computer is, typically, already equipped for infra-red communication, the role of the central apparatus can be implemented at little extra cost. Moreover, such a computer is prepared for or already fitted with a modem, enabling cost-effective multi-room group communication.

The role of the central apparatus 100 is, advantageously, performed by a special apparatus which offers additional functionality to the system. This special apparatus may, for instance, be located in a shop. When the normal apparatuses get near enough the special apparatus, communication can get established. In addition to the applications already present in the end apparatuses, various other applications can be executed. An example of such an application is a "notice board" application, where end apparatuses can prepare and send a short note to the special apparatus, which displays the note on a large screen. Similarly, the large screen could act as a graffiti wall, where drawings made on an apparatus are automatically displayed on the graffiti wall.

Advantageously, the central apparatus 100 and the relay apparatus 110 are fitted with high quality infra-red transceivers. Preferably, the infra-red transmitter is able to transmit a strong signal over a wide and is the infra-red receiver able to receive over a wide-angle.

We claim:

1. A communication system comprising a sending apparatus and a receiving apparatus communicating via a wireless communication medium;

said receiving apparatus comprising message receiving means for receiving via said wireless communication medium a message destined for said receiving apparatus;

said sending apparatus comprising message sending means for transmitting a message via said wireless communication medium, characterised:

in that said system comprises at least three end apparatuses and a central apparatus; each end apparatus and the central apparatus being a sending apparatus as well as a receiving apparatus;

in that each end apparatus comprises execution means for executing a group application; said group application, while being executed by said execution means, communicating application messages to a corresponding group application in at least one other end apparatus via said central apparatus;

in that said message sending means of each end apparatus is configured to send said application messages only to said central apparatus;

in that said central apparatus comprises group resolution means for, upon said message receiving means receiving a first application message from a first one of said end apparatuses, determining a group of end apparatuses for which said first application message is destined and for causing said message sending means to transmit said first application message to end apparatuses of said group.

2. A system as claimed in claim 1, wherein said receiving apparatus comprises a communication identification, which identifies said receiving apparatus with respect to said wireless communication medium; said message receiving means is configured to receive a message in a message frame identifying said receiving apparatus; said message sending means is configured to transmit a message in a message frame identifying a receiving apparatus, characterised in that said group resolution means is configured to transmit said first application message to end apparatuses of said group by causing said message sending means to transmit separate message frames, each comprising said first application message, to said end apparatuses of said group.

3. A system as claimed in claim 1, characterised:

in that said message sending means is configured to transmit a message in a broadcast frame;

in that said message receiving means is configured to receive a message in a broadcast frame;

in that said group resolution means is configured to transmit said first application message to end apparatuses of said group by causing said message sending means of said central apparatus to transmit a broadcast frame comprising said first application message to said end apparatuses of said group.

4. A system as claimed in claim 2, wherein said receiving apparatus comprises acknowledge sending means for transmitting an acknowledgement frame upon said message receiving means correctly receiving a message frame, and wherein said sending apparatus comprises acknowledge receiving means for receiving an acknowledgement frame, characterised:

in that each message frame sent by an end apparatus and comprising an application message further comprises said communication identification of the sending end apparatus; and in that said central apparatus comprises confirmation means for, upon said acknowledge receiving means receiving an acknowledgment frame in response to each message frame transmitted by said central apparatus and comprising said first application message, causing said message sending means to transmit a confirmation message to the end apparatus which sent said first application message.

5. A system as claimed in claim 2, wherein said receiving apparatus comprises acknowledge sending means for transmitting an acknowledgement frame upon said message receiving means correctly receiving a message frame, and wherein said sending apparatus comprises acknowledge receiving means for receiving an acknowledgement frame, characterised:

in that each message frame sent by an end apparatus and comprising an application message further comprises said communication identification of the sending end apparatus; and in that said confirmation means is configured to cause said message sending means to transmit a negative confirmation message to the end apparatus which sent said first application message if said acknowledge receiving means does not receive within a predetermined period an acknowledgment frame in response to each message frame transmitted by said central apparatus and comprising said first application message.

6. A system as claimed in claim 1, characterised:

in that said message sending means is configured to transmit a message in a broadcast frame;

in that said message receiving means is configured to receive a message in a broadcast frame;

in that said central apparatus comprises construction means for constructing a group of communicating apparatuses by causing said message sending means to transmit a broadcast frame comprising an invitation message inviting end apparatuses to join a group;

in that each end apparatus comprises acceptance means for, upon said message receiving means receiving a broadcast frame comprising said invitation message inviting to join a group, verifying whether said invitation to join should be accepted or rejected by said end apparatus and for, if said invitation is to be accepted by said end apparatus, causing said message sending means to transmit a message frame identifying said central apparatus and comprising an acceptance message and the identification of said end apparatus;

in that said central apparatus comprises storage means for storing a membership list for each group of apparatuses executing corresponding group applications; said list corresponding to said group and comprising said communication identification of each apparatus of said group; and in that said construction means is further configured to store for each received message frame, which comprises an acceptance message and the identification of an end apparatus, said identification in the membership list which corresponds to the group being constructed.

7. A system as claimed in claim 6, characterised:

in that said invitation message comprises an identification of a group application; and in that said acceptance means further verifies whether the group application identified in the received invitation message should be executed by said end apparatus and, if so, causing said execution means to execute said application.

8. A system as claimed in claim 6 characterised:

in that said end apparatus comprises initiative means for causing said message sending means to transmit an initiative message to said central apparatus indicating that said end apparatus wishes to execute a group application; and in that said construction means is configured to, upon said message receiving means receiving said initiative message, causing said message sending means to transmit said invitation message.

9. A system as claimed in claim 8, characterised:

in that said initiative message comprises an identification of a group application, which the end apparatus wishes to execute; and in that said construction means is configured to use said group application identification in the received initiative message as the group application identification in said invitation message.

10. A system as claimed in claim 1, characterised:

in that said central apparatus comprises storage means and display means; said storage means storing at least one membership list; said list comprising identifications of end apparatuses executing corresponding group applications and forming a group; said display means displaying said membership list and its identifications of end apparatuses;

in that said end apparatus comprises selection means for causing said message sending means to transmit a message frame identifying said central apparatus and comprising a message requesting to join a selected group and the identification of said end apparatus;

in that said central apparatus comprises updating means for, upon receiving a message requesting to join a selected group and the identification of an end apparatus, adding said end apparatus to a membership list, which corresponds to said selected group, and causing said display means to update the display of said membership list.

11. A system as claimed in claim 6, characterised:

in that each end apparatus is configured to participate in at most one group at a time;

in that each message frame sent by an end apparatus and comprising an application message further comprises said communication identification of the sending end apparatus; and in that for a received message frame comprising an application message said group resolution means determines said group of end apparatuses by extracting the communication identification of the sending end apparatus from the received message frame and by locating among said membership lists a list which comprises said extracted identification.

12. A system as claimed in claim 6, characterised:

in that at least one end apparatus is configured to participate simultaneously in a plurality of groups;

in that said storage means stores for each membership list a corresponding group identification; said group identification uniquely identifying a group within said system;

in that each message frame comprising an application message further comprises said communication identification of an end apparatus and one of said group identifications; and in that for a received message frame comprising an application message said group resolution means determines said group of end apparatuses by extracting said group identification from the received message frame and by locating among said membership lists a list which corresponds to a group corresponding to said group identification.

13. A system as claimed in claim 6, characterised:

in that at least one end apparatus is configured to participate simultaneously in a plurality of groups;

in that for each membership list said storage means stores a sub-identification for each end apparatus on said list; said sub-identification uniquely identifying a group within said end apparatus;

in that each message frame comprising an application message further comprises said communication identification of an end apparatus and one of said sub-identifications for said end apparatus;

in that for a received message frame comprising an application message said group resolution means determines said group of end apparatuses by extracting the communication identification and the sub-identification of the sending end apparatus from the received message frame and by locating among said membership lists a list which comprises said extracted identifications.

14. A system as claimed in claim 6, characterised:

in that at least one end apparatus is configured to participate simultaneously in a plurality of groups; said apparatus comprising a plurality of said communication identifications, where each communication identification within said apparatus corresponds to one of said plurality of groups and earth communication identification is unique within said system;

in that each message frame sent by an end apparatus and comprising an application message further comprises a selected one of said communication identifications of the sending end apparatus; and in that for a received message frame comprising an application message said group resolution means determines said group of end apparatuses by extracting the selected communication identification of the sending end apparatus from the received message frame and by locating among said membership lists a list which comprises said extracted identification.

15. A system as claimed in claim 1, characterised:

in that said system comprises a first subsystem and a second subsystem; said first subsystem comprising said end apparatuses and said central apparatus; said second subsystem comprising a further end apparatus and a relay apparatus;

in that said relay apparatus is a sending apparatus as well as a receiving apparatus;

in that said relay apparatus and said central apparatus are connected via a further communication medium;

in that said central apparatus and said relay apparatus comprise second message sending means for sending a message via said further communication medium and second message receiving means for receiving a message transmitted via said further communication medium;

in that said group resolution means is configured to, if said group of end apparatuses comprises a second apparatus of said second subsystem, cause said second message sending means to transmit to said relay apparatus a relay message comprising said first application message and indicating said communication identification of said second apparatus;

in that said relay apparatus comprises relay means for, upon said second receiving means receiving said relay message, causing said first message sending means to transmit said first application message to an end apparatus indicated by said communication identification in said relay message;

in that said relay means is configured to, upon said message receiving means receiving a second application message from a third one of said end apparatuses, causing said second message sending means to transmit a second relay message comprising said second application message and indicating said communication identification of said third apparatus; and in that said group resolution means is configured to, upon said second message receiving means receiving said second relay message, determining a group of end apparatuses for which said second application message is destined and for causing said message sending means to transmit said second application message to each end apparatus of said first subsystem, which is a member of said group.

* * * * *